Dec. 1, 1970

R. S. JOHN, JR 3,544,207

SHUTTER CONTROL MECHANISM

Filed Jan. 3, 1968

Inventor:
Robert S. John, Jr.

By Griffin and Branigan
Attys

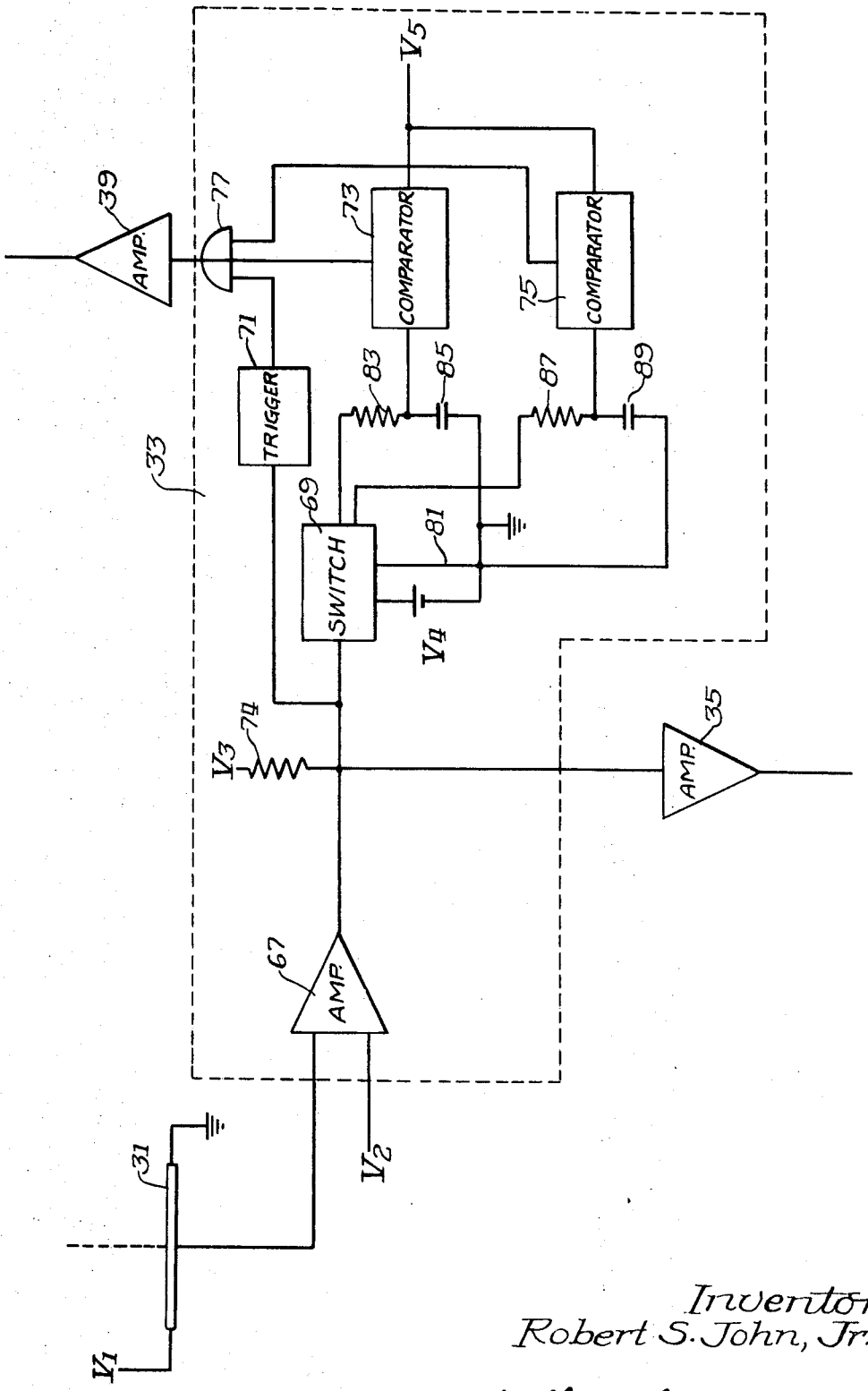

United States Patent Office

3,544,207
Patented Dec. 1, 1970

3,544,207
SHUTTER CONTROL MECHANISM
Robert S. John, Jr., Deerfield, Ill., assignor to Bell & Howell Company, Chicago, Ill., a corporation of Illinois
Filed Jan. 3, 1968, Ser. No. 695,451
Int. Cl. G03b 41/10
U.S. Cl. 352—109
14 Claims

ABSTRACT OF THE DISCLOSURE

A shutter control mechanism for a continuous film movement motion picture projector. The location of indexing marks on the motion picture film is sensed by a photo-potentiometer which controls the closing of the projector's shutter. One closure occurs each time an indexing mark reaches the end of a mark aperture gate, and a second closure occurs midway between two end closures. The midway closure is created by controlling the charging and discharging of a pair of capacitors so that the midframe closure occurs exactly between end frame closures.

Recent advances in the motion picture projection art have resulted in the development of continuous film motion picture projectors. That is, the motion picture projectors have been developed wherein the film continuously moves through the projector during projection as compared with prior art projectors wherein the film intermittently moves through the projector during projection.

Many of these continuous film motion picture projectors do not utilize mechanical systems for moving the film. That is, they do not utilize a sprocket wheel drive to engage teeth in the film because a sprocket drive causes film flutter. Rather, the location of a frame is sensed and a "sense" signal is used to control a capstan drive, for example. Because this type of drive system is not mechanically coupled to specific film locations (such as teeth engaging holes in the film), it is difficult to provide a means for mechanically driving a shutter blade as is done in intermittent film projectors. Hence, one of the problems in the development of continuous film motion picture projectors is providing a means for closing the shutter that is synchronous with the movement of the film. That is, one shutter closure must be provided each time the screen image moves from one frame to a following frame.

While it is relatively simple to provide a means for closing the shutter while moving from a first frame to a following frame, one shutter closure per frame is not satisfactory. Specifically, for a conventional film movement rate of 24 frames per second, it is well-known that two shutter closures during each frame must be performed to prevent flicker. Also, for slower frame rates more shutter closures per frame must be provided.

Therefore, it is an object of this invention to provide a new and improved shutter closure mechanism.

It is also an object of this invention to provide a shutter closure mechanism suitable for use with a continuous film movement motion picture projector.

It is a further object of this invention to provide a shutter control mechanism that closes the shutter at points intermediate the end of each frame as well as closes the shutter at the end of each frame.

It is a still further object of this invention to provide a shutter control mechanism for a continuous film motion picture projector that closes the shutter at the end of each frame and closes the shutter midway between the end of the film frames.

SUMMARY OF THE INVENTION

In accordance with a principle of this invention, a shutter control mechanism is provided wherein the location of an indexing mark on the projected film is sensed. The sensing means generates a signal when the indexing mark reaches a predetermined position. This signal closes the shutter gate.

In accordance with a further principle of this invention, the signal from the sensing means also controls the charging and discharging of a capacitive network. The charging and discharging of the capacitive network is used to control the closure of the shutter at a point intermediate the time when the film's indexing marks reach the predetermined position.

In accordance with a still further principle of this invention, a pair of capacitors are used. One capacitor is charged during the period between two indexing marks reaching the predetermined position. The other capacitor is discharged during this period. The discharging capacitor causes a shutter closure when it is discharged to a predetermined voltage level.

It will be appreciated by those skilled in the art and others, that this invention provides a means for controlling the shutter movement in a continuous film motion picture projector. By having the indexing mark related to the film frames of the projector, a means is provided for closing the shutter during the period of movement from one frame to a second frame. In addition, by utilizing a capacitor control system wherein a pair of capacitors are charged and then discharged, an intermediate frame closure means is provided. The intermediate frame closure prevents flicker.

BRIEF DESCRIPTION OF THE DRAWINGS

The foregoing objects and many of the attendant advantages of this invention will become more readily appreciated as the same become better understood by reference to the following detailed description when taken in conjunction with the accompanying drawings wherein:

FIG. 2 is a partially schematic and partially block diagram illustrating a control system suitable for use with the embodiment of the invention illustrated in FIG. 1.

DESCRIPTION OF THE PREFERRED EMBODIMENT

Figure 1:
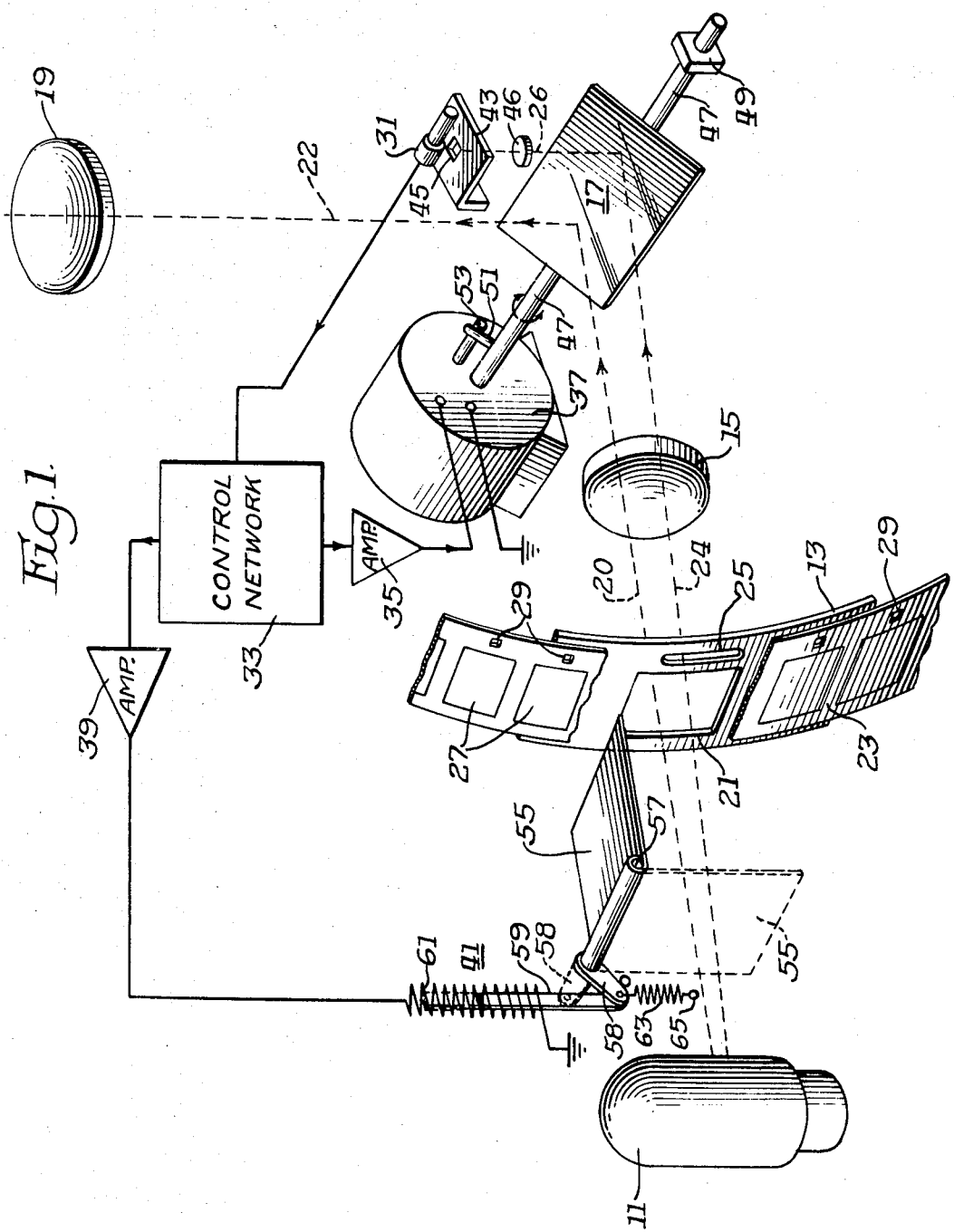
FIG. 1 is a schematic perspective illustrating a preferred embodiment of the invention.

FIG. 1 illustrates a continuous film movement motion picture projector using the photopotentiometer shutter control system of the invention. The projector illustrated in FIG. 1 generally comprises a film lamp 11, a film gate 13, a lens 15, a rocking mirror 17, and a projection lens 19.

The lamp 11, a film frame aperture 21 in the film gate 13, the lens 15, and the rocking mirror 17 are all aligned along a projection axis 20 so that light from the lamp passes through the aperture and the lens and impinges on the rocking mirror 17. The light is reflected by the rocking mirror and passes along a continuation of the projection axis 22 through the projection lens 19. A film strip 23 is adapted to continuously move through the film gate's film frame aperture 21 in a continuous manner by means not herein shown. Hence, the lamp projects film frames 27 through the lens 15 to the rocking mirror. These frames are reflected by the mirror 17 to the projection lens 19 where they are projected onto a screen, for example.

An indexing mark aperture 25 is located adjacent the first aperture 21 in the film gate 13. A plurality of indexing marks 29 (which may be sprocket drives) are located in the film in such a position that they pass through the opening of the indexing mark aperture. One indexing mark 29 is adjacent to each frame 27 of the film. Light from the lamp 11 also passes along an indexing axis 24 through the second aperture 25, through the lens 15, and impinges on the rocking mirror 17. The indexing axis light is reflected by the rocking miror and passes along a continuation of the indexing axis 26.

For reasons hereinafter described, both the first and second apertures are larger than their respective elements in the film. Specifically, the first aperture 21 is longer than a film frame 27 in the direction of film movement. Hence, more than one frame is in the first aperture at one time. Further, the second aperture 25 is also longer in the direction of film movement than the size of the indexing marks 29. Preferably, the length of the second aperture is slightly greater than the distance between two adjacent indexing marks 29.

Also illustrated in FIG. 1 is a photopotentiometer 31, an electronic control network 33, a galvanometer amplifier 35, a galvanometer 37, a shutter amplifier 39, and a shutter 41. A plate 43 having an aperture 45 and a lens 46 are mounted, by means not shown, adjacent to the photopotentiometer and limit the amount of extraneous light that impinges on the photosensitive surface of the photopotentiometer. Further, the photopotentiometer 31, the lens 46 and the plate's aperture are mounted so that they intersect light reflected by the rocking mirror and passed along the continuation of the indexing axis 26.

The output from the photopotentiometer 31 is connected to the input of the electronic control 33. The electronic control 33 has two outputs. The first output of the electronic control is connected to the input of the galvanometer amplifier 35 and the second output of the electronic control is connected to the input of the shutter amplifier 39.

The output of the galvanometer amplifier 35 is connected to one terminal of the galvanometer 37. The second terminal of the galvanometer 37 is connected to the ground. The galvanometer 37 has a shaft 47 extending through it and projecting out one end. The rotatable mirror is fixedly atached to the projecting portion so that as the galvanometer shaft 47 rotates, the mirror rotates therewith. The other end of the projecting portion of the shaft 47 is rotatably mounted in a fixture 49 connected to the projector's housing by means not shown. The end of the shaft extending through the other side of the galvanometer has a finger 51 that projects at a right angle to the longitudinal direction of the shaft. A stop member 53 is fixedly attached to the housing of the galvanometer 37 and co-acts with the finger 51 to limit the rotation of the shaft 47.

The shutter 41 is shown located between the projection lamp 11 and the film aperture gate 21 and comprises a blade member 55 rotatably attached at one 57 to the projector's housing by means not shown. The rotatable end of the blade 55 has a projecting element 58 that is attached to the armature 59 of a solenoid. One end of the coil 61 of the solenoid is connected to ground and the other end is connected to the output of the shutter amplifier 39.

Attached to the point of connection between the projecting element 58 and the armature 59 is a spring 63 having its open end 65 fixedly attached to the projector's housing by means not shown. The spring is illustrated in FIG. 1 as compressed. However, when the solenoid coil 61 is energized to pull the armature into it, the spring expands. This operation causes the blade 55 to move into the projection axis 20 but not the indexing axis 24 resulting in shutter action. When the solenoid is de-energized the spring pulls the blade 55 out of the projection axis. It is to be understood that the shutter 41 illustrated in FIG. 1 is merely by way of example and, that many electronically-operated shutters are suitable for use with the invention.

Turning now to the operation of the projection mechanism illustrated in FIG. 1, as the film moves through the gate 13, light from the lamp passes the open shutter 41 along the indexing axis 24, through the second aperture 25, through an indexing mark 29 located in that aperture, and impinges on the rotatable mirror 17. This light is reflected by the mirror through the plate aperture 45 to the photopotentiometer 31. The photopotentiometer generates an output signal as long as the light from the lamp is impinging on its photosensitive surface. This output signal is compared to a reference signal in the electronic control and an error signal is applied to the galvanometer amplifier 35 when the light from the indexing mark moves from a predetermined position on the face of the photopotentiometer. The error signal is amplified by the amplifier and applied to the galvanometer causing the galvanometer's shaft to rotate. The galvanometer's shaft rotates the rotatable mirror 17 so that the indexing mark's light is returned to the predetermined position. Hence, as the film moves through the gate, the rotatable mirror is continuously rotated because an error signal is continuously generated by the photopotentiometer. In this manner the film image is maintained stationary on the screen while the film is continuously moved.

More specifically, assume that the film 23 is moving upwardly as viewed in FIG. 1 and assume that the rotatable mirror starts at an initial condition wherein light from an indexing mark 29 at the bottom of the second aperture 25 falls on the predetermined position on the photosensitive surface of the photopotentiometer. As the film moves upwardly, the light from the indexing mark moves from the predetermined position and the photopotentiometer generates an error signal. This error signal, as described above, is amplified and applied to the galvanometer. The error signal causes the galvanometer's shaft to rotate, thereby rotating the mirror and bringing the light from the indexing mark back to the predetermined position. This operation continues until the indexing mark reaches the upper end of the second aperture, then the galvanometer shaft resets to its initial condition. Hence, a closed loop servosystem is provided that maintains the light from the indexing mark stable on the photosensitive surface of the photopotentiometer.

In essence, the rotation of the mirror 17 causes the continuation of the indexing axis 26 to be maintained along a predetermined line even though the mark being followed is moving. In addition, because the continuation of the indexing axis is maintained stationary, the continuation of the projection axis 22 is also maintained stationary. And, maintenance of the projection axis stationary maintains the film images stationary on the screen. Hence, the system provides a steady screen image for a continuously moving film.

The shutter operates when the indexing mark reaches the upper end of the second aperture 25. At this point approximately zero light is received by the photopotentiometer 31 and, as described above, the mirror resets to its initial condition. During the reset period a pulse signal is generated in the electronic control network, as passed through the shutter amplifier 39 and is applied to the solenoid coil 61. The pulse applied to the solenoid coil 61 energizes the coil. When the coil is energized, it withdraws its armature 59. When this action occurs, the shutter's blade cuts off the projection of the film image. Hence, shutter action is provided during movement from one film frame to the next film frame.

One of the problems with a single shutter operation per film frame in a projection device is that for nominal frame movement rates of 24 frames per second or 18 frames per second a single shutter operation causes flicker. It is well known in the art that at least two shutter operations for 24 frames per second or three shutter operations for 18 frames per second are necessary to prevent flicker. Hence, it is necessary for the electronic control system to provide an additional pulse or pulses intermediate the pulses caused by the movement of the mirror from one frame to the next frame. An example of an electronic control network that accomplishes this desirable function for a 24-frame per second film speed is illustrated in FIG. 2.

FIG. 2 illustrates an electronic control network 33 for controlling the galvanometer 37 and the shutter 41. The electronic network illustrated in FIG. 2 comprises a comparison amplifier 67, a switch 69, a trigger circuit 71, a first comparator 73, a second comparator 75, and a three input OR gate 77.

The photopotentiometer 31 has its inputs connected between a first voltage source V1 and ground. The output from the photopotentiometer is connected to one input of the comparison amplifier 67. The second input of the comparison amplifier is connected to a second or reference voltage source V2. The output from the comparison amplifier 67 is connected through a resistor 79 to a third voltage source V3, to the input of the galvanometer amplifier 35, to the input of the trigger circuit 71, and to the input of the switch 69.

The switch has two additional inputs, one connected to ground through a conductor 81 and the second connected to one terminal of a fourth voltage source V4. The other terminal of V4 is connected to ground. The switch also has two outputs. One output of the switch is connected through a second resistor 83 connected in series with a first capacitor 85 to ground. The second output of the switch 69 is connected through a third resistor 87 connected in series with a second capacitor 89 to ground.

The junction between the second resistor and the first capacitor is connected to one input of the first comparator 73. Similarly, the junction between the third resistor and the second capacitor is connected to one input of the second comparator 75. The second inputs of the first and second comparators are connected to a fifth voltage source V5.

The output of the trigger circuit is connected to the first input of the OR gate 77. The output of the first comparator 73 is connected to the second input of the OR gate and the output of the second comparator 75 is connected to the third input of the OR gate. The output of the OR gate is connected to the input of the shutter amplifier 39.

The switch 69 is adapted to apply one of its second and third inputs to one of its outputs and to apply the other of those two inputs to the other output and vice versa. That is, when the voltage source V4 is connected to the output end of the second resistor 83, the ground connector 81 is connected to the output end of the third resistor 87. Upon a switching input signal from the comparison amplifier 67, the switch changes to its opposite state. In the opposite state, the input from the voltage source V4 is connected to the output end of the third resistor 87 and the ground connector 81 is connected to the output end of the second resistor 83. In this manner the switch alternatively charges the capacitors 85 and 89 from the voltage source V4 and then discharges them to ground through the ground connector 81. Consequently, while one capacitor is charging the other is discharging and vice versa.

The comparison amplifier 67 generates an output signal when there is an error between its input signals. This error occurs when there is a difference between the voltage from source V2 and the output from the photopotentiometer. As described above, a small error signal occurs when the indexing mark is not at a predetermined position on the photosensitive surface of the photopotentiometer, and a large error signal occurs when the indexing mark 29 reaches the end of the second aperture 25 and the rotatable mirror is reset. It is this large error signal that triggers the trigger circuit 71. When the trigger circuit is tiggered, a pulse passes through the OR gate and the shutter amplifier, and energizes the shutter coil 61. The shutter then closes while the mirror rotates to its starting location.

The large error output from the comparison amplifier 67 also causes the switch 69 to switch to an opposite state. It is the switch 69 in combination with the resistor-capacitor series circuits and the comparators that create midpoint switching. More specifically, during one complete frame period either the first capacitor 85 or the second capacitor 89 is charged while the other is discharged. After a capacitor has been charged, the switch switches to its opposite state and the capacitor starts to discharge. When it discharges to a level that compares with the V5 voltage level, an output trigger is applied through the OR gate and the amplifier to the shutter coil 61. By suitably choosing the RC time constant of the resistor-capacitor series circuits, the pulse occurs directly between two reset pulses and an intermediate frame shutter operation occurs. Hence, two shutter operations occur per frame.

Turning now to a specific example of the invention where V4 is the charging voltage and V5 is the discharge voltage level. With this condition, the following equation holds:

$$V5 = V4 e^{-td/RC} (1 - e^{-tc/RC}) \quad (1)$$

where:
$td$ = time of discharge
$tc$ = time of charge
R = resistance of 83 or 87
C = capacitance of 85 or 89

By differentiating (1) with respect to $tc$ where $td = tc/2$ (2) the following equation results:

$$RC = tc/\ln 3 \quad (3)$$

Because $tc = \frac{1}{24}$ sec. for a 24-frame per second rate of projection a value for RC is determined by Equation 2. In addition, by substituting Equations 2 and 3 into Equation 1 a relationship between V4 and V5 is determined. This relationship is: $V5 = 0.385 V4$. Moreover, it has been found that when a capacitor is charged through a resistor from a voltage source when connected in a circuit of the type illustrated in FIG. 2 for a frame period equal to $\frac{1}{24}$ sec. and then the capacitor is discharged through the same resistor until the voltage across the capacitor becomes 0.385 of the charging voltage, the discharge time is within 0.001 second of being exactly half the frame period, over a frame rate range of 19 to 31 frames per second. Hence, the circuit illustrated in FIG. 2 solves the problem of mid-frame shutter closure even when the frame rate varies over a relatively wide range.

Two comparators in combination with two resistor-capacitor charging networks are necessary because the capacitors are charged for a complete frame. Hence, if only one circuit were used, intermediate shutter closure operation would occur in every other frame. However, with two comparators and two capacitor circuits, an intermediate shutter operation occurs for each frame.

Further, the comparators must include sensing networks that sense the discharging of a capacitor and allow pulse creation only when a capacitor is being discharged, not when it is charged because two V5 comparisons occur for each two frames, one comparison during discharging and the other during charging. Because it is the discharge comparison that is used, means must be provided so that the comparators ignore the charge comparison.

It will be appreciated that the foregoing description has described a preferred embodiment of the invention wherein means are provided for sensing the location of a film frame. Means are also provided for closing a shutter when the projection mechanism moves from one frame to a following frame. In addition, means are provided for closing the shutter at a point intermediate the ends of the frames.

While the foregoing description has described a preferred embodiment of the invention, it will be appreciated by those skilled in the art that numerous modifications can be made in light of the invention teachings. For example, a photopotentiometer is used in the invention because it generates a large, position-sensitive output signal. However, in some environments it may be desirable to use a light detecting device that generates a different type of output signal. Further, only one intermediate frame shutter closure has been described. However, the control system can be extended so that more than one interme- The embodiments of the invention in which an exclusive property or privilege is claimed are defined as follows:

1. A shutter control mechanism for use in a continuous film movement motion picture projector comprising:

electronic sensing means for sensing the location of film frames as they move through said projector and for generating an electronic signal, said electronic sensing means including a light detecting element adapted to intersect light passing through indexing marks located on the film moving through said projector; and, shutter control means connected to the shutter of said projector for controlling the closing of said shutter when said film frames reach predetermined positions, said shutter control means including a comparing means connected to the output of said light detecting element for comparing the output of said light detecting element with a reference signal and a trigger means connected to the output of said comparing means for generating a trigger pulse when said comparing means detects a predetermined comparison.

2. A shutter control mechanism as claimed in claim 1 wherein said light detecting element is a photopotentiometer.

3. A shutter control mechanism as claimed in claim 1 including an amplifier connected between the output of said trigger means and said shutter.

4. A shutter control mechanism as claimed in claim 3 wherein said shutter is mounted between the projection lamp and the film frame aperture of said motion picture projector.

5. A shutter control mechanism as claimed in claim 4 including intermediate frame shutter closure means for creating an intermediate frame shutter closure.

6. A shutter control mechanism as claimed in claim 5 wherein said intermediate frame shutter closure means comprises a capacitor network that is alternately charged and discharged.

7. A shutter control mechanism as claimed in claim 5 wherein said intermediate frame shutter closure means comprises a switch connected to the output of said comparing means and a pair of capacitors that are alternately charged and discharged by said switch.

8. A shutter control mechanism as claimed in claim 7 wherein said intermediate frame shutter closure means also includes a pair of comparators, one input of each comparator connected to a reference voltage source and the other input of each comparator connected to one of said capacitors, the output of said comparators connected to said amplifier.

9. A shutter control mechanism as claimed in claim 8 including a three input OR gate connected between the outputs of said trigger means, said first comparator and said second comparator, and the shutter of said projector.

10. A shutter control mechanism for use in a continuous film movement motion picture projector comprising:

electronic sensing means for sensing the location of film frames as they move through said projector; said electronic sensing means comprising a light detecting element for intercepting light passing through index marks located on the film and generating an electronic signal;

shutter control means connected to said electronic sensing means and to the shutter of said projector for controlling the closing of said shutter when said film frames reach predetermined position; and, intermediate frame shutter closure means for creating an intermediate frame shutter closure, said intermediate shutter closer means comprising a capacitor network including a pair of capacitors, one of said capacitors being charged and the other being discharged during the periods of time between said film frames reaching said predetermined positions, said discharging capacitor causing the generation of pulses intermediate the shutter closings that occur when said film frames reach said predetermined positions.

11. A shutter control mechanism as claimed in claim 10 wherein said shutter control means includes:

a comparator means connected to the output of said light detecting element for comparing the output signal of said light detecting element with a reference signal; and a trigger means connected to the output of said comparing means for generating a trigger pulse when said comparing means detects a predetermined comparison.

12. A shutter control mechanism as claimed in claim 11 wherein said intermediate frame shutter closure means also comprises a switch connected to the output of said comparing means and connected to said pair of capacitors so that said capacitors are alternately charged and discharged by said switch.

13. A shutter control mechanism as claimed in claim 12 wherein said intermediate frame shutter closure means also includes a pair of comparators, one input of each comparator connected to a reference voltage source and the other input of each comparator connected to one of said capacitors, the output of said comparators connected to the shutter of said projector.

14. A shutter control mechanism as claimed in claim 13 wherein said light detecting element is a photopotentiometer.

References Cited

UNITED STATES PATENTS

| | | | |
|---|---|---|---|
| 1,749,394 | 3/1930 | Proksa | 352—208 X |
| 2,083,646 | 6/1937 | Fuller | 352—176 |
| 2,215,464 | 9/1940 | Dorgeld | 352—109 |
| 2,504,734 | 4/1950 | Schmidling | 352—208 X |
| 2,588,813 | 3/1952 | Dube | 352—204 X |
| 2,843,006 | 7/1958 | Tyler | 352—109 |

FOREIGN PATENTS 245,772  1/1927  Great Britain.

NORTON ANSHER, Primary Examiner

M. H. HAYES, Assistant Examiner

U.S. Cl. X.R.

352—92, 204